(12) United States Patent
Tobin et al.

(10) Patent No.: US 8,783,883 B2
(45) Date of Patent: Jul. 22, 2014

(54) METHOD FOR CONTROLLING POWER TO A MOTOR IN A VEHICLE DOOR MIRROR

(75) Inventors: William J. Tobin, Columbus, OH (US); Takayuki Furui, Dublin, OH (US); Timothy Edward Kiss, Columbus, OH (US); Ohito Takahashi, Dublin, OH (US); Masakazu Endo, Saitama Prefecture (JP)

(73) Assignees: Honda Motor Co., Ltd., Tokyo (JP); Weastec, Inc., Hillsboro, OH (US)

( * ) Notice: Subject to any disclaimer, the term of this patent is extended or adjusted under 35 U.S.C. 154(b) by 497 days.

(21) Appl. No.: 12/947,326

(22) Filed: Nov. 16, 2010

(65) Prior Publication Data

US 2012/0050901 A1 Mar. 1, 2012

Related U.S. Application Data

(60) Provisional application No. 61/378,228, filed on Aug. 30, 2010, provisional application No. 61/387,660, filed on Sep. 29, 2010.

(51) Int. Cl.
*B60R 1/072* (2006.01)
*G02B 7/182* (2006.01)

(52) U.S. Cl.
CPC ............... *B60R 1/072* (2013.01); *Y10S 359/90* (2013.01)
USPC ............................ 359/877; 359/872; 359/900

(58) Field of Classification Search
CPC ......... G02B 7/182; B60R 1/062; B60R 1/072
USPC .................. 359/872, 873, 874, 876, 877, 900
See application file for complete search history.

(56) References Cited

U.S. PATENT DOCUMENTS

| 4,540,252 | A |   | 9/1985  | Hayashi et al. |
| 4,678,295 | A | * | 7/1987  | Fisher ........................... 359/874 |
| 4,770,522 | A | * | 9/1988  | Alten ............................ 359/873 |
| 4,798,967 | A | * | 1/1989  | Yamana et al. .............. 307/10.1 |
| 4,929,878 | A |   | 5/1990  | Hansen |
| 4,981,349 | A | * | 1/1991  | Tamiya et al. ................ 359/877 |
| 4,986,646 | A | * | 1/1991  | Hamamoto et al. .......... 359/873 |
| 5,111,125 | A |   | 5/1992  | Barrs |
| 5,467,230 | A | * | 11/1995 | Boddy et al. .................. 359/874 |
| 5,914,824 | A | * | 6/1999  | Valentino ...................... 359/843 |
| 5,952,802 | A | * | 9/1999  | Pimley .......................... 318/468 |
| 5,993,018 | A | * | 11/1999 | Hattori et al. ................. 359/877 |
| 6,315,420 | B1 |  | 11/2001 | Standen et al. |
| 6,841,960 | B2 |  | 1/2005  | Yamada et al. |
| 6,867,510 | B2 |  | 3/2005  | Kramer et al. |
| 6,900,605 | B2 | * | 5/2005  | Nakaho ......................... 318/280 |

(Continued)

OTHER PUBLICATIONS

International Search Report and Written Opinion of PCT/US2011/047986 dated Dec. 6, 2011.

*Primary Examiner* — Ricky D Shafer
(74) *Attorney, Agent, or Firm* — Rankin, Hill & Clark LLP

(57) ABSTRACT

In a vehicle door mirror including a motor and an adjuster assembly driven by the motor for moving a mirror glass connected with the adjuster assembly, a method for controlling delivery of power to the motor is described. The method can include detecting a voltage being supplied by a vehicle battery of the vehicle that includes the vehicle door mirror, and controlling delivery of power to the motor based on the detected voltage. A memory mirror system is also disclosed.

15 Claims, 7 Drawing Sheets

(56) References Cited

U.S. PATENT DOCUMENTS

| | | |
|---|---|---|
| 7,370,985 B2 | 5/2008 | Boddy et al. |
| 7,407,298 B2 * | 8/2008 | Onuki et al. .................. 359/841 |
| 7,940,017 B2 * | 5/2011 | Takemasa .................... 318/280 |
| 2002/0063473 A1 | 5/2002 | Kramer et al. |
| 2005/0225886 A1 | 10/2005 | Yamada |
| 2006/0120622 A1 | 6/2006 | Dwyer et al. |
| 2008/0088960 A1 * | 4/2008 | Sim .............................. 359/877 |
| 2008/0186603 A1 * | 8/2008 | Sho et al. ..................... 359/841 |
| 2009/0001910 A1 | 1/2009 | Nagao et al. |
| 2009/0122433 A1 | 5/2009 | Iwasaki et al. |

* cited by examiner

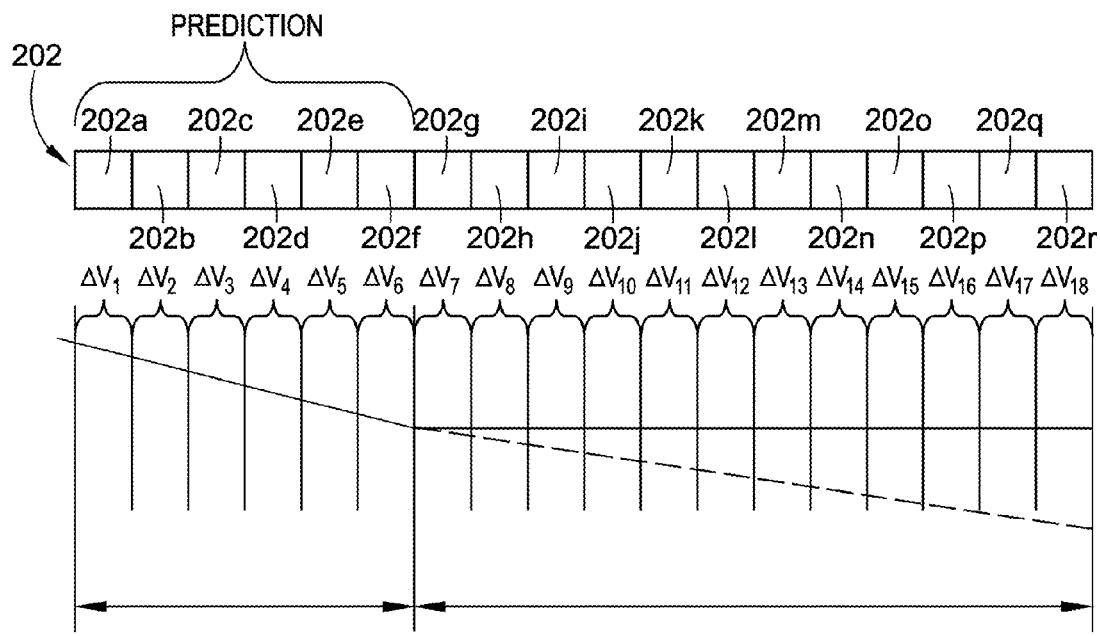

METHOD FOR CONTROLLING POWER TO A MOTOR IN A VEHICLE DOOR MIRROR

This application claims the benefit of U.S. provisional patent application Ser. No. 61/378,228, filed Aug. 30, 2010, and Ser. No. 61/387,660, filed on Sep. 29, 2010 which are incorporated by reference in their entirety herein.

BACKGROUND

Exemplary embodiments herein relate to automatic vehicle door mirrors. Automatic vehicle door mirrors include a memory mirror controller ("MMC") that automatically moves a mirror glass as a part of its function. Movement of the mirror glass is controlled by a motor connected to the mirror glass through a gear transmission. If during MMC controlled movement, the mirror glass encounters an obstruction and is blocked from moving, then the motor and gear transmission can slip ratcheting back and forth while making a loud clicking noise. This has been found undesirable by customers.

To limit the motor slip during MMC controlled movement, the MMC continually checks data from a sensor to confirm that the mirror glass is moving toward a target position. If the mirror glass is not moving toward the target position, then the MMC controlled movement is stopped. Due to vehicle voltage and ambient temperatures, motor speeds for the motor in the vehicle mirror can vary widely. To prevent a slow-moving motor from being mis-detected as a slipping motor, the MMC waits for a predetermined period of time during which slip detection is prohibited. During the slip protection prohibition time, if the mirror glass is blocked from moving and is being driven by a fast moving motor, slipping will occur and the customer may hear several loud undesirable clicks. On the other hand, if the mirror glass is being driven by a slow moving motor, the MMC may mistakenly conclude, based on the data received from the sensor, that the mirror is blocked, and therefore stop delivery of electrical power to the motor before the motor reaches the target position.

SUMMARY

In a vehicle door mirror including a motor and an adjuster assembly driven by the motor for moving a mirror glass connected with the adjuster assembly, a method for controlling delivery of power to the motor that can overcome at least some of the aforementioned shortcomings is described below. The method can include detecting a voltage being supplied by a vehicle battery of the vehicle that includes the vehicle door mirror, and controlling delivery of power to the motor based on the detected voltage.

A vehicle memory mirror system that can overcome the aforementioned shortcomings includes a vehicle battery, a mirror glass, an adjuster assembly, a motor, and a mirror controller. The adjuster assembly connects with the mirror glass and includes a gear. The motor includes an output shaft operatively connected with the gear. Rotational movement of the output shaft results in movement of the gear, which results in movement of the mirror glass. The mirror controller is in electrical communication with the vehicle battery and the motor. The mirror controller is configured to control delivery of electrical power to the motor based on a voltage output from the vehicle battery.

BRIEF DESCRIPTION OF THE DRAWINGS

FIG. 10 is a schematic depiction of an example of a sensor position array.

FIG. 11 is a schematic depiction of updating the sensor position array depicted in FIG. 10.

DETAILED DESCRIPTION

Figure 1:
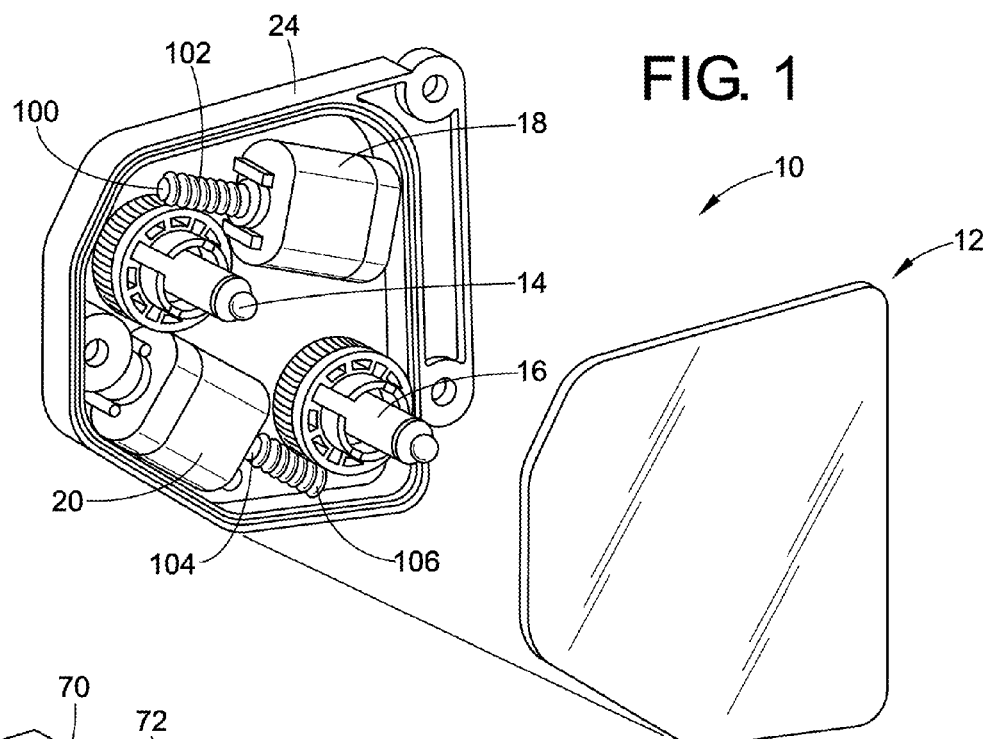
FIG. 1 is a perspective view of a vehicle door mirror with a mirror glass of the mirror removed from an adjuster assembly.

The descriptions and drawings herein are merely illustrative and various modifications and changes can be made in the structures and steps disclosed without departing from the present disclosure. Various identified components of a vehicle disclosed herein are merely terms of art and may vary from one vehicle manufacturer to another. These terms should not be deemed to limit the present disclosure. All references to direction and position, unless otherwise indicated, refer to the orientation of the vehicle components illustrated in the drawings and should not be construed as limiting the appended claims. Like numerals refer to like parts throughout several views.

Referring now to the drawings, which are shown for the purposes of illustrating one or more exemplary embodiments and are not for purposes of limiting the appended claims, FIG. 1 schematically depicts a vehicle door mirror 10 that includes a mirror glass 12. The orientation of the mirror glass 12 can be changed with respect to the vehicle (not shown) to which the vehicle door mirror is attached using an adjuster assembly, two of which are shown in FIG. 1: a first adjuster assembly 14 and a second adjuster assembly 16. The first adjuster assembly 14 is driven by a first motor 18 and the second adjuster assembly 16 is driven by a second motor 20. The adjuster assemblies 14, 16 and the motors 18, 20 mount in a housing 24. When electrical power is provided to the motors 18, 20, in a manner that will be described in more detail below, the mirror glass 12 can tilt in a vertical plane and/or a horizontal plane. The mirror glass 12 connects to the adjuster assemblies 14, 16 to allow for movement of the mirror glass when the motors 18, 20 are operating.

Figure 2:
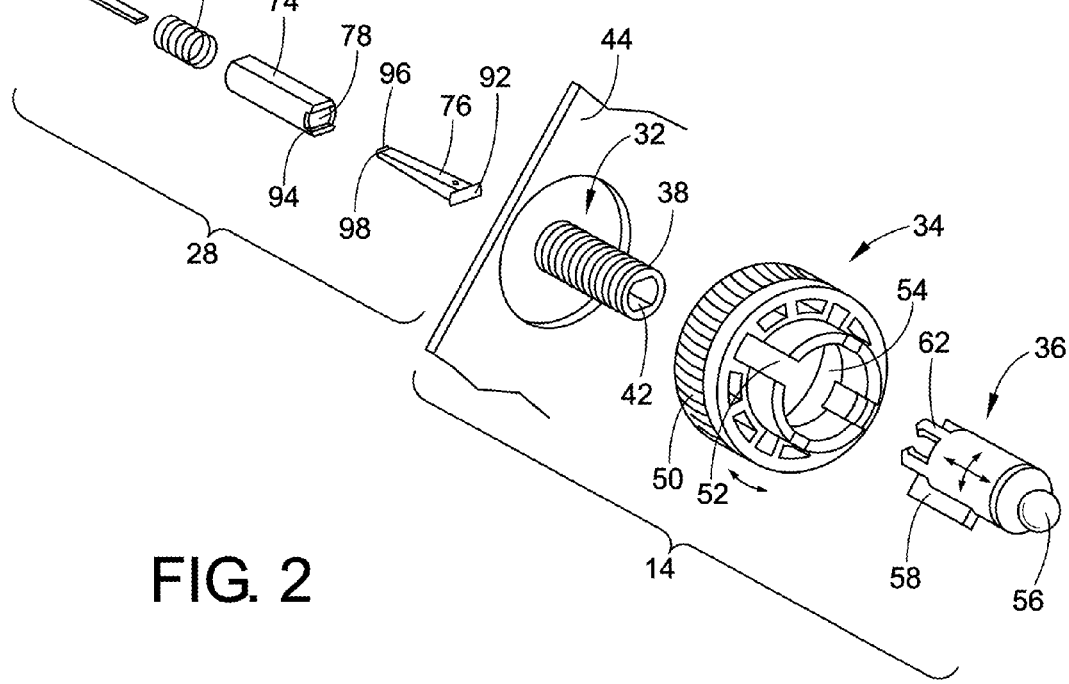
FIG. 2 is an exploded view of the adjuster assembly and a mirror position sensor for the vehicle door mirror depicted in FIG. 1.

FIG. 2 depicts an exploded view of the first adjuster assembly 14 and a mirror glass position sensor 28 that cooperates with the first adjuster assembly. With reference back to FIG. 1, the second adjuster assembly 16 includes identical components and a second mirror glass position sensor 30 (not visible in FIG. 1, but schematically depicted in FIG. 6) that includes identical components as the first mirror glass position sensor. Accordingly, the first adjuster assembly 14 and the first mirror glass position sensor 28 will be described with particularity with the understanding that the second adjuster assembly 16 and the second mirror glass position sensor 28 operate in the same manner.

The first adjuster assembly 14 includes a guide 32, a worm wheel 34, and an adjust nut 36. The guide 32 includes external screw threads 38 and a keyed central bore 42. The guide 32 is fixed to the housing 24, more particularly to a planar base surface 44 of the housing, to preclude rotational movement of the guide with respect to the housing. The worm wheel 34 includes a gear wheel 50, a stopping groove 52, and a central passage 54 extending through the worm wheel. The adjust nut 36 includes a globe pivot 56, a stopper 58 and nail portions 62 at an end of the adjust nut opposite the globe pivot. The globe pivot 56 is received in a receptacle (not visible) on a non-reflective side of the mirror glass 12 (FIG. 1).

The guide 32 is received in the central passage 54 of the worm wheel 34. The adjust nut 36 is also received in the central opening 54 of the worm wheel 34 and the nail portions 62 engage the outer screw threads 38 of the guide 32. Additionally, the stopper 58 is received in the stopping groove 52 such that rotational movement of the worm wheel 34 results in rotational movement of the adjust nut 36 since the nail portions 62 engage the outer screw thread 38 of the guide 32. Rotational movement of the worm wheel 34 also results in translational movement of the adjust nut 36 towards and away from the planar base surface 44 of the housing 24.

With continued reference to FIG. 2, the first mirror glass position sensor 28 includes a resistor strip 70, a coil spring 72, a sliding block 74, and a sliding contactor 76. The sliding block 74 is inserted into the central bore 42 of the guide 32. The sliding block 74 includes a central passage 78 and the resistor strip 70 is inserted into this central passage. The coil spring 72 is also received in the central bore 42 of the guide 32 and pushes the sliding block 74 away from the base surface 44 of the housing 24. The sliding contactor 76 is fixed to the sliding block 74 and is received in the central passage 78 of the sliding block to engage opposite sides of the resistor strip 70.

Figure 5:
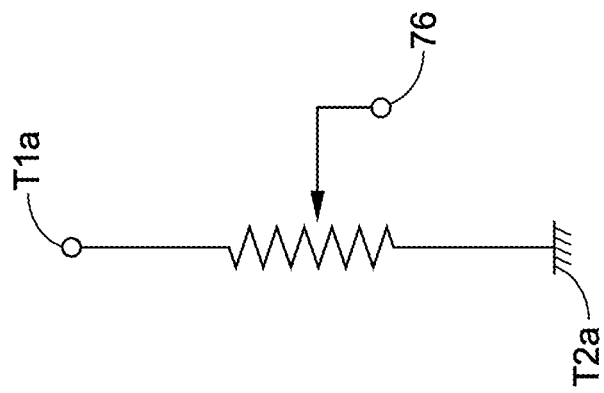
FIG. 5 is a schematic view of the mirror position sensor depicted in FIG. 2.
Figure 4:
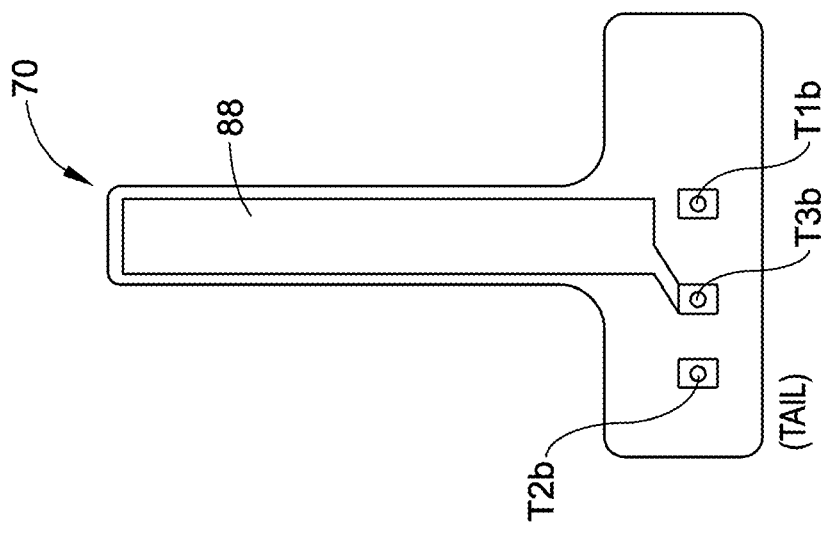
FIG. 4 is a plan view of an opposite side of the resistor strip shown in FIG. 3.
Figure 3:
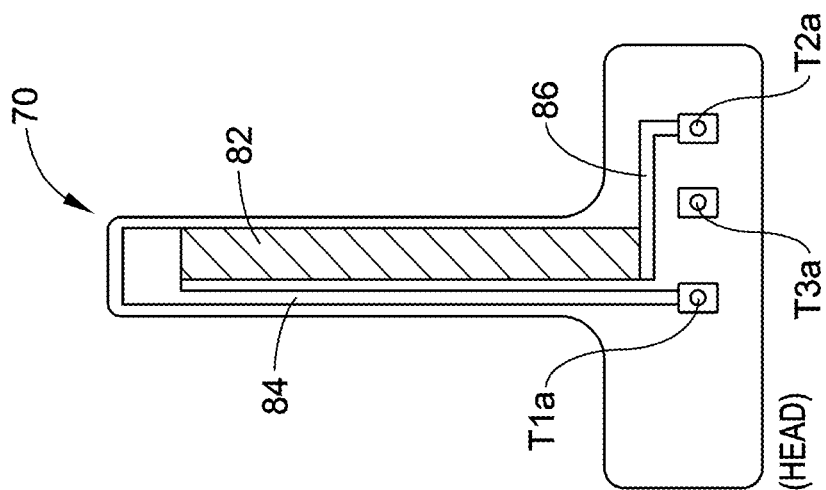
FIG. 3 is a plan view of a resistor strip for the mirror position sensor depicted in FIG. 2.

FIGS. 3 and 4 depict head and tail surfaces of the resistor strip 70, respectively. FIG. 5 shows an equivalent electrical circuit of the resistor strip 70 and the sliding contactor 76. The illustrated resistor strip 70 is T-shaped and includes three terminals: T1a, T2a and T3a on the head surface and the T1b, T2b and T3b on the tail surface. As shown in FIG. 3, a resistive layer 82 is formed on the head surface of the resistor strip 70. A first conductive metal terminal layer 84 is formed on the head surface and electrically contacts with one end (upper end in FIG. 3) of the resistive layer 82. The first conductive metal terminal layer 84 extends to the terminal T1a which is connected to an electric power source terminal. A second conductive metal terminal layer 86 is formed on the head surface and electrically contacts with the other (lower) end of the resistive layer 82. The second conductive metal terminal layer 86 extends to the terminal T2a which is assigned as the ground terminal.

As shown in FIG. 4, a conductive strip layer 88 is formed on the tail surface of the resistor strip 70. The conductive strip layer 88 is terminated at a terminal T3b. Terminals T1b and T2b are connected to the electric power source terminal and the ground, respectively. FIG. 5 depicts an equivalent electrical circuit function of the resistor strip 70. The terminals T3a and T3b operate as the output of the mirror position sensor 30 and the terminals T1a and T1b are connected to the electric power source terminal and the other terminals T2a and T2b are connected to the ground.

The resistor strip 70, which includes the conductive strip layer 88, is inserted into the sliding block 74 (FIG. 2) and the sliding contactor 76 (FIG. 2) pinches the head and tail surfaces of the resistor strip. With reference back to FIG. 2, the sliding contactor 76 is formed similar to a pair of tweezers and includes a keyed platform 92 that fits into a complementary shaped notch 94 formed in the sliding block 74 so that the sliding contactor moves with the sliding block. Two distal ends 96, 98 of the sliding contactor 76 make electrical contact with the resistive layer 82 (FIG. 3) and the conductive strip layer 88 (FIG. 4), respectively. The sliding block 74 is inserted into the adjust nut 36 and is pushed by the coil spring 72 against the adjust nut 36. The sliding contactor 76 is not rotated by the rotation of the adjust nut 36.

With reference back to FIG. 1, the first motor 18 includes an output shaft 100 having a worm gear 102 attached thereto. The second motor 20 also includes an output shaft 104 and a worm gear 106 attached thereto. The second motor 20 operates in a manner similar to the first motor 18, therefore, only an explanation of the first motor will be provided.

When the first motor 18, as shown in FIG. 1, rotates for the purpose of changing the sight angle of the mirror glass 12, the worm wheel 34 (shown in FIG. 2), which makes a screw contact with the worm gear 102, rotates. Since the stopper 58 formed on a cylindrical surface of the adjustment nut 36 meets the stopping groove 52 in the worm wheel 34, the adjust nut 36 rotates in accordance with the rotation of the worm wheel 34. The nail portions 62 of the adjust nut 36 has a screw contact with the screw thread 38 formed on an outer surface of the guide 32 and therefore the nail portions 62 make a spiral motion in accordance with the rotation of the worm wheel 34.

The sliding block 74 and the sliding contactor 76 move up and down with the movement of the adjust nut 36. When the adjust nut 36 extends most from the guide 32, i.e., the adjuster assembly 14 pushes most ahead the mirror glass 12, the sliding contactor 76 has an electrical contact with the resistive layer 82 at the closest position to the first conductive metal terminal layer 84, which extends to the terminal T1a and contacts at the closest position to one end (upper end in FIG. 3) of the resistor strip 70. When the adjust nut 36 extends least from the guide 32, i.e., the adjuster assembly 14 pushes least ahead the mirror glass 12, the sliding contactor 76 has an electrical contact with the resistive layer 82 at the closest position to the second conductive metal terminal layer 86, which extends to the terminal T2a and contacts at the closest position to the other end (lower end in FIG. 3) of the resistor strip 70. Therefore, the resistivity between the sliding contactor 76 and the terminal T1a or and between the sliding contactor 76 and the terminal T2a changes with the movement of the adjust nut 36.

The terminals T1a and T1b are connected to an electric power source (described later) and the terminals T2a and T2b to ground. Therefore the current from the electric power source flows from the terminals T1a and T1b, through the resistive layer 82 and to the terminals T2a and T2b. Since the resistive layer 82 and the conductive strip layer 88 are electrically connected through the sliding contactor 76 and the conductive strip layer 88 is connected to the terminals T3a and T3b, a voltage corresponding to the contactor position of the sliding contactor 76 is obtained at the terminal T3b. Therefore when the adjust nut 36 extends most from the guide 32, the voltage obtained at the terminal T3a is closest to the electric power source voltage. Conversely, when the adjust nut 36 extends least from the guide 32, the voltage obtained at the terminals T3*a* and T3*b* is closest to the ground voltage. The connection to the electric power source and the ground is equivalently shown as in FIG. 5. The voltage signal output obtained by sliding contactor 76 with the resistive layer 82 is detected by the terminals T3*a* and T3*b* and corresponds to the position of the sliding contactor 76 on the resistive layer 82. Therefore the extension of the adjust nut 36 from the guide 32 that results in the tilt angle of the mirror glass 12 with respect to the housing 24 can be detected by the voltage signal output.

Figure 6:
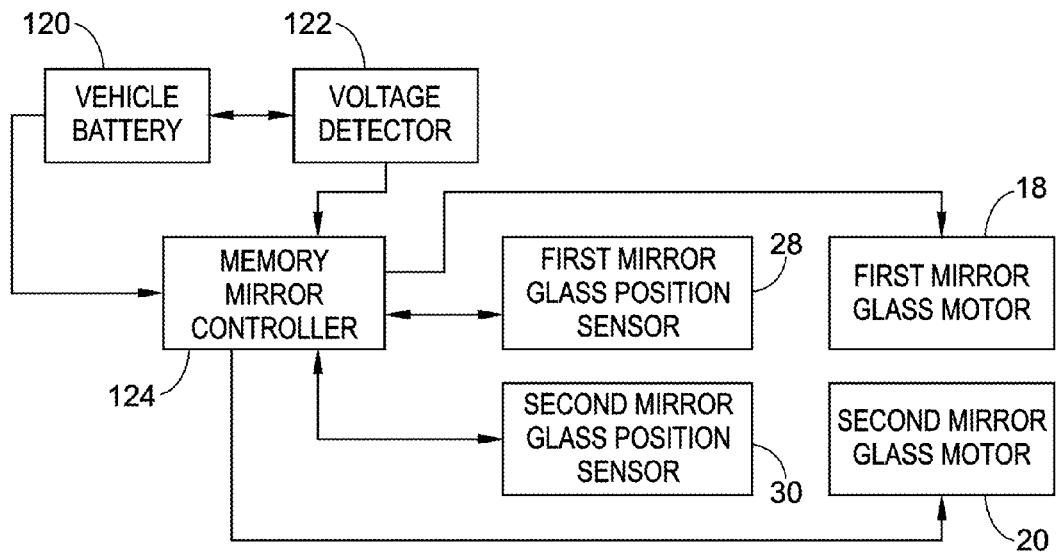
FIG. 6 is a block diagram schematically depicting a portion of a memory mirror system.

With reference to FIG. 6, a portion of a vehicle memory mirror system is shown as including a vehicle battery 120, a voltage detector 122 and a memory mirror controller ("MMC") 124. The vehicle battery 120 can be a conventional battery found in a conventional vehicle that can operate between about 12 volts to about 14.5 volts. The vehicle battery 120 can provide the electrical power source for the motors 18, 20 and the mirror glass position sensors 28, 30. The voltage detector 122 can be a conventional voltage detector that can detect voltage being output from the vehicle battery 120. The MMC 124, which can also be referred to as a mirror controller, is in electrical communication with the vehicle battery 120 and the first motor 18 and the second motor 20. The MMC 124 is also in electrical communication with the first mirror glass position sensor 28 and the second mirror glass position sensor 30. The MMC 124 is configured to control delivery of electrical power to the motors 18, 20 based on a voltage output from the vehicle battery 120. The MMC 124 is also configured to detect a change in position of the mirror glass 12 (FIG. 1) based on signal e.g., voltage readings, received from the mirror position sensors 28, 30 and is also configured to stop delivery of electrical power to the motors 18, 20 based on detecting no movement of the mirror glass 12 after a predetermined time has elapsed with no change in mirror position. This predetermined time, after which the MMC 124 will stop delivery of electrical motors 18, 20 based on detecting no movement of the mirror glass 12, can be referred to as a prohibition time and is based on the voltage output from the vehicle battery 120.

As mentioned above, the MMC 124 is configured to control delivery of electrical power to the motors 18, 20 based on a voltage output from the vehicle battery. As explained above, due to varying vehicle battery voltage and ambient temperatures, motor speeds can vary widely. Accordingly, it can be desirable to control power delivery to the motors 18, 20 based on a voltage detected from the vehicle battery 120.

Figure 7:
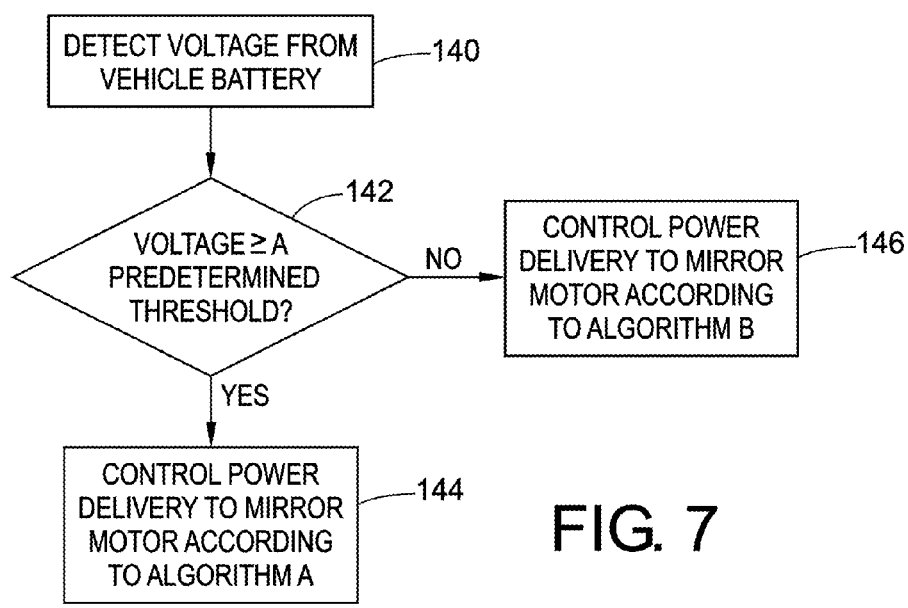
FIG. 7 is a flow diagram depicting a method for controlling delivery of power to a motor of the vehicle door mirror depicted in FIG. 1.

With reference to FIG. 7, a method for controlling power to at least one of the motors 18, 20 (FIG. 1) can include, at 140, detecting a voltage being supplied by the vehicle battery 120 (FIG. 6). The method for controlling delivery of power to the motor can further include controlling delivery of power to the motors 18, 20 based on the detected voltage. Accordingly, at 142, it is determined whether the voltage being supplied by the vehicle battery 120 is greater than a predetermined threshold. If the voltage being supplied by the vehicle battery 120 is greater than a predetermined threshold, then, at 144, power delivery to at least one of the motors 18, 20 can be controlled according to the first algorithm, referred to as algorithm A. If, however, the voltage is less than a predetermined threshold, then at 146, power delivery to the motors 18, 20 can be controlled according to another algorithm, which can be referred to as algorithm B. For example, if the voltage output from the vehicle battery 120 is about 12 volts, then power delivery to either motor 18, 20 can be controlled using a first algorithm. As another example, if the voltage being supplied by the vehicle battery 120 is greater than 12 volts, e.g. about 14.5 volts, then the power delivery to the motors 18, 20 can be controlled using a different algorithm than if the voltage being supplied by the vehicle battery was less than 12 volts. By using two different algorithms to control power delivery to the motors 18, 20, the likelihood can be reduced that a slow-moving motor is mis-detected as the mirror glass 12 contacting an obstruction. Moreover, for a fast-moving motor, the likelihood can be increased that power delivery to the motor can be shut off prior to the output shaft of the motor continuing to cooperate with the adjuster assembly while the mirror glass 12 is obstructed, which could result in an undesirable clicking noise.

A more particular example of a method for controlling delivery of power to the motors 18, 20 is described with reference to FIG. 8. At 160, the method can include detecting voltage from the vehicle battery 120 (FIG. 6). Detecting the voltage from the vehicle battery can include detecting the voltage being supplied by the vehicle battery 120 using the voltage detector 122. Alternatively, detecting the voltage can include receiving a signal from the vehicle battery 120 into the MMC 124 to determine the voltage being supplied by the battery based on the received signal. The method for controlling delivery of power to the motors 18, 20 (FIG. 1) can further include, at 162, determining a prohibition time based on the voltage detected from the vehicle battery 120. As mentioned above, to prevent a slow-moving mirror motor from being mis-detected as a slipping motor, the MMC 124 can wait for a set period of time, referred to as a prohibition time, during which slip detection is prohibited. The prohibition time can based on the voltage detected from the vehicle battery 120. For example, determining the prohibition time can include assigning a prohibition time A where the detected voltage from the vehicle battery is greater than X volts, and assigning a prohibition time B where the detected voltage is less than or equal to X volts, where A is less than B. Alternatively, determining the prohibition time can include assigning a prohibition time A where the detected voltage is greater than or equal to X volts and assigning a prohibition time B where the detected voltage is less than X volts, where A is less than B.

The method for controlling delivery of power to the motors 18, 20 can further include, at 164, sensing for a mirror glass position change. For example, as discussed above, the mirror glass position sensors 28, 30 (FIG. 6) generate a voltage output signal that is sent to the MMC 124 (FIG. 6). This voltage output signal can be sent multiple times over equally spaced intervals, e.g. every 50 ms. If there is no change in the voltage output signal over time, this can be an indication that the mirror glass 12 (FIG. 1) is stuck. The intervals can be greater than or less than 50 ms, and each interval need not be the same, i.e. the intervals can vary.

As discussed above, the method for controlling delivery of power to the motors 18, 20 (FIG. 1) can include waiting a time interval (e.g. 50 ms), at 166, and then again sensing for a mirror glass position change at 168. At 172, the method for controlling delivery of power to the motors 18, 20 can determine whether the position of the mirror glass has changed based on signals received from the mirror glass position sensors 28, 30. As will be explained in further detail below, where the position of the mirror glass 12 (FIG. 1) has not changed after the prohibition time has elapsed, the method for controlling delivery of power to the motor can stop power delivery to the motors 18, 20. Alternatively, where the position of the mirror glass has changed before the prohibition time has elapsed, power can continue to be delivered to the motors 18, 20.

Figure 8:
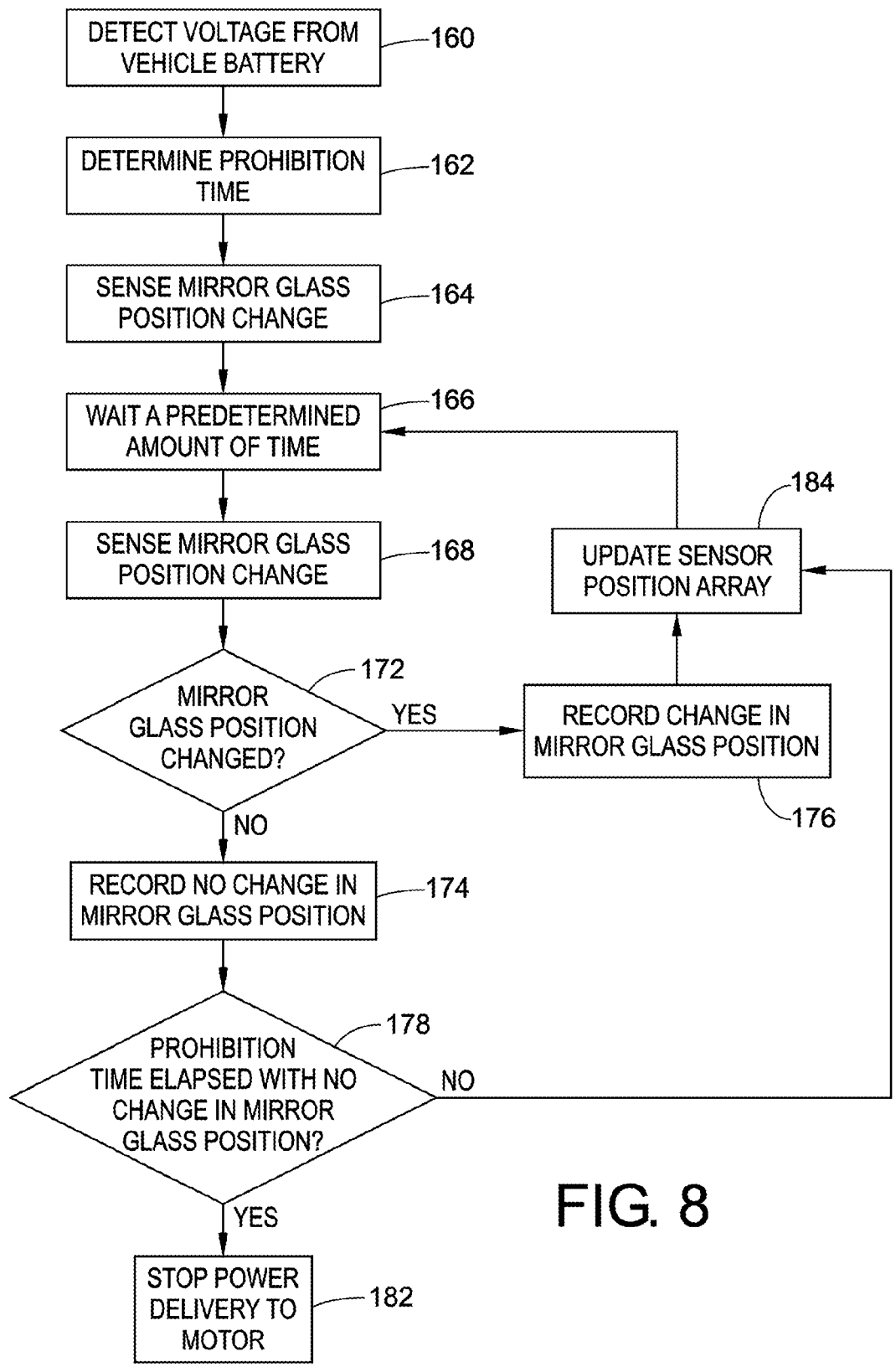
FIG. 8 is another flow diagram depicting a method for controlling delivery of power to the motor of the vehicle door mirror depicted in FIG. 1.

With continued reference to FIG. 8, records can be made in a memory of the MMC 124 where there is no change in mirror glass position at 174, or where there is a change in mirror glass position, at 176. If the mirror glass position has not changed, at 172, then at 178 a determination can be made as to whether the prohibition time has elapsed with no change in mirror glass position. If no change in mirror glass position has been made and the prohibition time has elapsed, then delivery of power to the motor can be stopped at 182. If the prohibition time has not elapsed with no change in mirror glass position, then a sensor position array (see FIG. 10) can be updated at 184, and then the method can return to waiting a predetermined time interval and again sensing for a change in mirror glass position at 166 and 168, respectively. If the mirror glass position has changed, at 172, then at 176 the change in mirror glass position can be recorded and the sensor position can be updated at 184.

Updating a sensor position array 200 will be described with reference to FIGS. 9-11. FIG. 10 depicts a specific example of a sensor position array having 18 blocks 202a-202r each used to store changes in sensor position ΔV after each time interval, which can be 50 ms, for example. The sensor position array 200 can operate in a binary manner where a "0" denotes no change in mirror glass position and a "1" denotes a change in mirror position. Alternatively, the sensor position array can store the actual change in voltage (ΔV).

Figure 9:
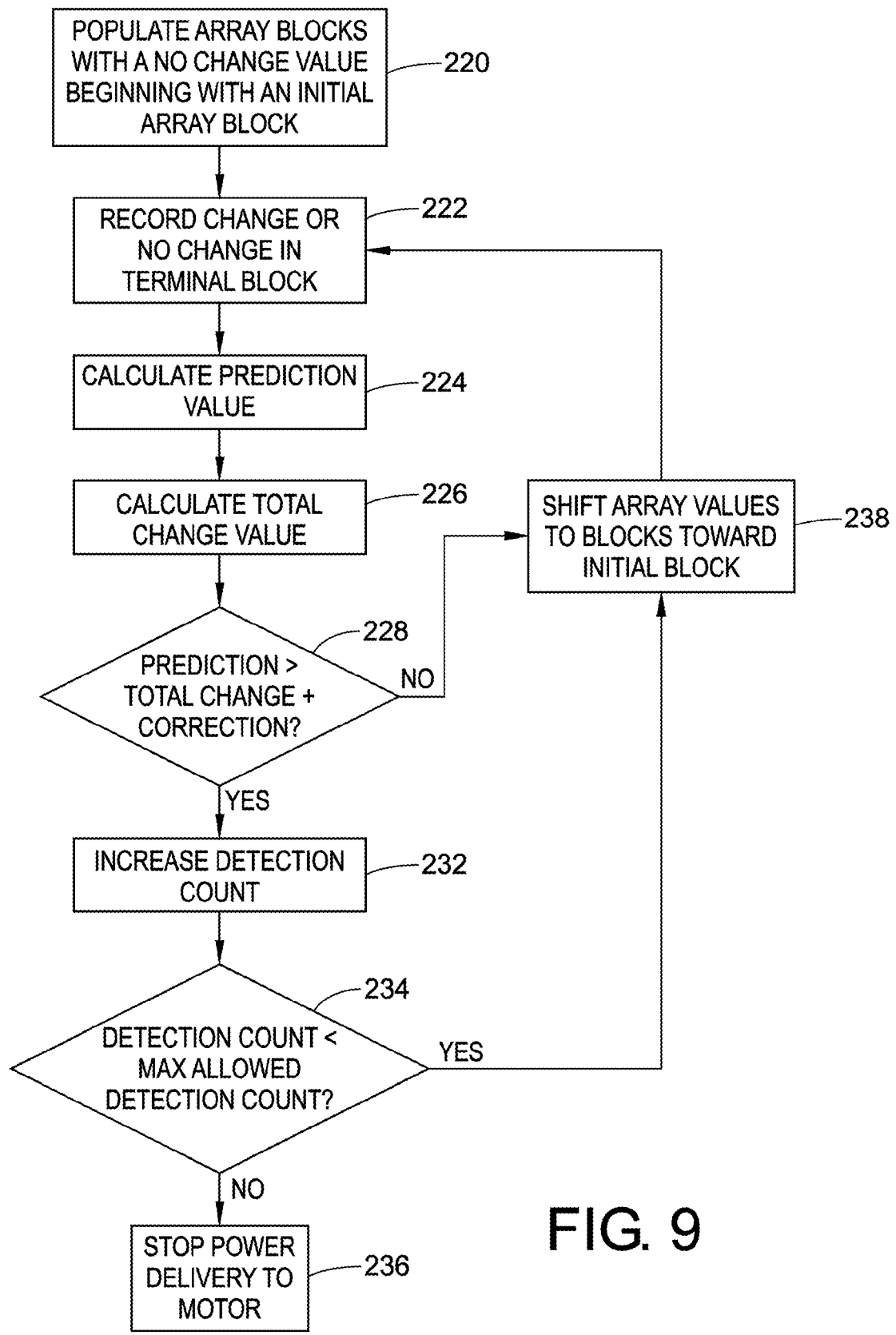
FIG. 9 is a flow diagram of a method for updating a sensor position array.

With reference to FIG. 9, which depicts a method for updating the sensor position array 200 (FIG. 10) and delivering power to the motors 18, 20 (FIG. 1), at 220, the array blocks 202a-202r (FIG. 10) can be populated with a no change value, e.g. "0," beginning with the initial array block 202a up to the array block 202q. At 222, a change in mirror position or no change in mirror position can be recorded in the terminal block 202r. In the example depicted in FIG. 11, a change in mirror position, i.e. a "1," is denoted in block 202r. At 224, a prediction can be made using data from array blocks near the initial block 202a. For example, a prediction value can be generated as the product of two times the sum of the prediction values between blocks 202a and 202f (shown in FIG. 10). A total change value can be calculated at 226, where the total change value is a sum of the blocks between 202a and 202r. At 228, a determination can be made as to whether the prediction value, from 224, is greater than the total change value, from 226, plus a correction factor, e.g. 25%. If the prediction value is greater than the total change value plus the correction, then at 232, a detection count can increase. The detection count can begin with 0 and increase to the number of blocks used for the prediction value, which in the depicted example is six blocks, i.e. blocks 202a-202f. At 234, a determination can be made as to whether the detection count is less than a maximum allowed detection account. If the detection count is not less than a maximum allowed detection account, then this is an indication that the motors 18, 20 are slipping because no change in position for the mirror glass 12 (FIG. 1) has been recorded and thus at 236 power delivery to the motors 18, 20 (FIG. 1) can be stopped. If the detection is less than the maximum allowed detection count, at 234, then the array values can be shifted towards the initial block 202a (FIG. 10), at 238, and power can remain to being delivered to the motors 18, 20 and the method can revert to step 222 where a change or no change can be recorded in the terminal block 202r. Similarly, if at 228 the prediction value is not greater than the total change value plus correction, then at 238, the array values can be shifted toward the initial block 202a and a change or no change can be recorded in the terminal block 202r.

FIG. 11 schematically depicts updating the sensor position array for 18 samples at t1 time intervals. For example, where the time interval for detecting a change in mirror glass 12 (FIG. 1) position is 50 ms, the total time for detecting whether the motors 18, 20 are slipping is 900 ms for an array having 18 blocks. Other time intervals and a fewer or greater number of array blocks can be used.

Figure 12:
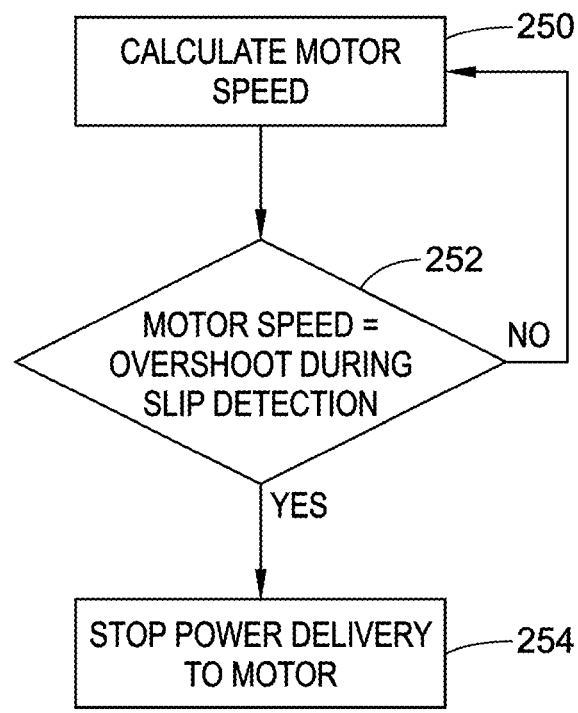
FIG. 12 is another flow diagram depicting a method for controlling delivery of power to the motor of the vehicle door mirror depicted in FIG. 1.
Figure 13:
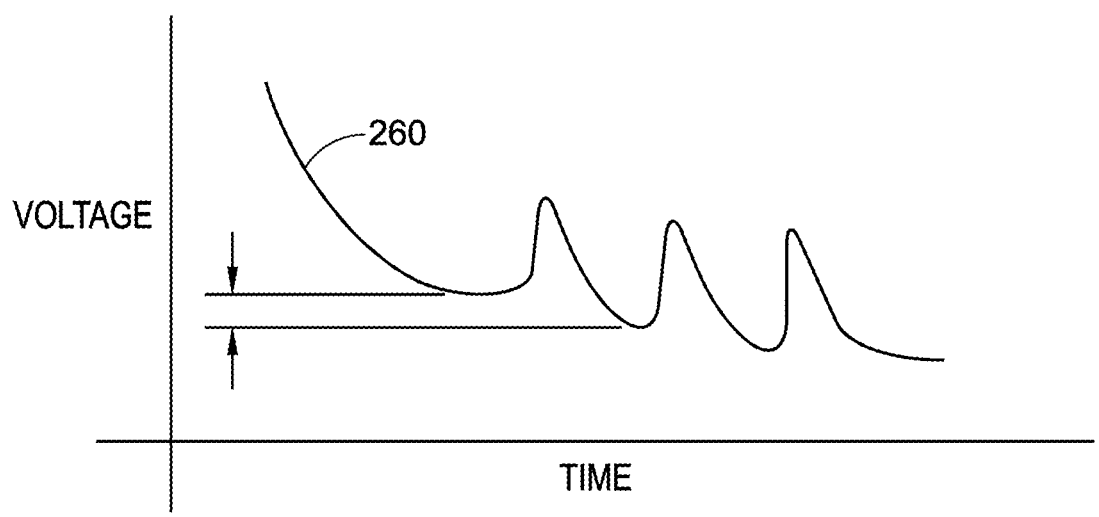
FIG. 13 is a schematic depiction of mirror position sensor data.

FIGS. 12 and 13 depict another method of controlling power delivery to the motors 18, 20 (FIG. 1). As discussed above, controlling the delivery of power to the motors 18, 20 can be based on voltage being supplied by the vehicle battery 120 (FIG. 6). Accordingly, the method schematically depicted in FIGS. 12 and 13 can be useful after determining the voltage output from the vehicle battery. With reference to FIG. 12, at 250, the motor speed for the motors 18, 20 can be calculated. Motor speed can be calculated using the data provided by the mirror position sensors 28, sending data to the MMC 124. At 252, if the MMC 124 (FIG. 6) detects a motor speed equal to the maximum overshoot during slip detection, then, at 254 power delivery can be stopped to the motors 18, 20. If, however, motor speed is not equal to the overshoot during slip detection, then the method can revert back to calculating the motor speed.

With reference to FIG. 13, sensor output is schematically depicted by line 260, which shows voltage as compared to time. The spikes at the right hand portion of the line 260 denote ratcheting events where the mirror glass 12 (FIG. 1) is in contact with an obstruction and the motors 18, 20 (FIG. 1), especially the worm gear attached to the motor, ratchets with respect to the worm wheel. If the maximum overshoot during a ratcheting event is known, then if the MMC detect a motor speed equal to the overshoot during a slip detection, the motor output can be stopped.

A method for controlling power delivery to a motor in a vehicle door mirror and a vehicle door mirror system have been described with particularity above. Modifications and alterations will occur to those upon reading and understanding the preceding detailed description. The invention is not limited to only those embodiments described above. Instead, the invention is broadly defined by the appended claims and the equivalents thereof.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. In a vehicle door mirror including a motor and an adjuster assembly driven by the motor for moving a mirror glass connected with the adjuster assembly, a method for controlling delivery of power to the motor comprising:
   detecting a voltage being supplied by a vehicle battery; and
   controlling delivery of power to the motor based on the detected voltage, wherein the step of controlling delivery of power to the motor further includes:
   calculating a motor speed for the motor;
   determining a maximum overshoot for a slip detection, which occurs when the mirror glass contacts an obstruction and the adjuster assembly generates an audible click as a result of the motor driving the adjuster assembly while the motor glass is precluded from moving;
   comparing the calculated motor speed with the maximum overshoot; and
   stopping delivery of power to the motor when the calculated motor speed equals the maximum overshoot.

2. In a vehicle door mirror including a motor and an adjuster assembly driven by the motor for moving a mirror glass connected with the adjuster assembly, a method for controlling delivery of power to the motor comprising:
    detecting a voltage being supplied by a vehicle battery; and
    controlling delivery of power to the motor based on the detected voltage,
wherein the step of controlling delivery of power to the motor further includes:
    determining a prohibition time based on the voltage detected from the vehicle battery;
    sensing for a change in mirror glass position via at least one mirror glass position sensor;
    waiting a predetermined amount of time;
    after waiting the predetermined amount of time, again sensing for another change in mirror glass position via the at least one mirror glass position sensor;
    determining whether a position of the mirror glass has changed based on signals received from the at least one mirror glass position sensor;
    where the position of the mirror glass has not changed after the prohibition time has elapsed, stopping power delivery to the motor; and
    where the position of the mirror glass has changed before the prohibition time has elapsed, continuing power delivery to the motor.

3. The method of claim 2, wherein the step of detecting a voltage includes detecting the voltage being supplied by the vehicle battery using a voltage detector, and the step of determining a prohibition time includes assigning a first prohibition time A where the detected voltage is greater than a predetermined threshold (X) volts and assigning a second prohibition time B where the detected voltage is less than or equal to the predetermined threshold (X) volts, where the first prohibition time A is less than the second prohibition time B.

4. The method of claim 2, wherein the step of detecting a voltage includes detecting the voltage being supplied by the vehicle battery using a voltage detector, and the step of determining a prohibition time includes assigning a first prohibition time A where the detected voltage is greater than or equal to a predetermined threshold (X) volts and assigning a second prohibition time B where the detected voltage is less than the predetermined threshold (X) volts, where the first prohibition time A is less than the second prohibition time B.

5. The method of claim 2, further comprising:
    recording no change or a respective change in the mirror glass position;
    where no change in the mirror glass position is recorded, determining whether the prohibition time has elapsed;
    where a respective change in the mirror glass position is recorded, returning to waiting the predetermined amount of time.

6. The method of claim 5, where the prohibition time has elapsed, stopping power delivery to the motor.

7. The method of claim 5, further comprising updating a sensor position array having a predetermined array size based on the recorded no change or respective change in the mirror glass position.

8. The method of claim 7, wherein the step of updating a sensor position array includes recording a first value in the array when a respective change in the mirror glass position is detected and recording a second value in the array when no change in the mirror glass position is detected.

9. The method of claim 8, wherein the step of updating a sensor position array includes shifting recorded values in a predetermined direction.

10. The method of claim 9, wherein the step of controlling delivery of power to the motor further includes stopping delivery of power to the motor when a prediction value exceeds a sum of array values in the sensor position array multiplied by a correction factor.

11. The method of claim 10, wherein the prediction value equals a sum of a predetermined number of sequential array values beginning with an initial array value.

12. A vehicle memory mirror system comprising:
    a vehicle battery;
    a mirror glass;
    an adjuster assembly connected with the mirror glass, the adjuster assembly including a gear;
    a motor including an output shaft operatively connected with the gear, wherein rotational movement of the output shaft results in movement of the gear, which results in movement of the mirror glass;
    a mirror controller in electrical communication with the vehicle battery and the motor, wherein the mirror controller is configured to control delivery of electrical power to the motor based on a voltage output from the vehicle battery; and
    a mirror position sensor in electrical communication with the mirror controller and configured to detect a change in position of the mirror glass, wherein the mirror controller is configured to stop delivery of electrical power to the motor based on detecting no movement of the mirror glass after a predetermined time has elapsed with no change in the position of the mirror glass, wherein the predetermined time is based on the voltage output from the battery.

13. The system of claim 12, wherein the mirror controller is configured to record a change in position or a no change in position based on data received from the mirror position sensor.

14. The system of claim 13, wherein the mirror controller is configured to increase a detection count based on receiving data from the mirror position sensor indicating no change in the position of the mirror glass.

15. The system of claim 14, wherein the mirror controller is configured to stop delivery of power to the motor based on the detection count being greater than a predetermined threshold.

* * * * *